(12) United States Patent
Martinson et al.

(10) Patent No.: US 10,816,974 B2
(45) Date of Patent: Oct. 27, 2020

(54) PROACTIVE ACQUISITION OF DATA FOR MAINTENANCE OF APPEARANCE MODEL BY MOBILE ROBOT

(71) Applicant: TOYOTA JIDOSHA KABUSHIKI KAISHA, Toyota-shi, Aichi-ken (JP)

(72) Inventors: Eric Martinson, Sunnyvale, CA (US); Rui Guo, Mountain View, CA (US); Yusuke Nakano, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 239 days.

(21) Appl. No.: 15/623,088

(22) Filed: Jun. 14, 2017

(65) Prior Publication Data
US 2018/0246512 A1    Aug. 30, 2018

Related U.S. Application Data

(63) Continuation-in-part of application No. 15/445,630, filed on Feb. 28, 2017.

(51) Int. Cl.
*G05D 1/00* (2006.01)
*G06K 9/00* (2006.01)
(Continued)

(52) U.S. Cl.
CPC ......... *G05D 1/0088* (2013.01); *G05D 1/0246* (2013.01); *G05D 1/0274* (2013.01);
(Continued)

(58) Field of Classification Search
CPC .................................................... G05D 1/246
See application file for complete search history.

(56) References Cited

U.S. PATENT DOCUMENTS

| 8,379,920 B2 | 2/2013 | Yang et al. |
| 8,427,472 B2 | 4/2013 | Moravec |

(Continued)

FOREIGN PATENT DOCUMENTS

| JP | 2007-41657 | 2/2007 |
| JP | 2007-156577 | 6/2007 |

(Continued)

OTHER PUBLICATIONS

Martinson et al., "Identifying People with Soft-Biometrics at Fleet Week." Proceedings of the 8th ACM/IEEE international conference on Human-robot interaction. IEEE Press, 2013 (8 pages).

(Continued)

*Primary Examiner* — Imran K Mustafa

(57) ABSTRACT

The novel technology described in this disclosure includes an example method comprising selecting a target of interest having an obsolete appearance model, the obsolete appearance model describing a prior appearance of the target of interest, navigating a first mobile robot to a location the first mobile robot including a mechanical component providing motive force to the first mobile robot and an image sensor, and searching for the target of interest at the location. The method may include collecting, in the location by the image sensor of the first mobile robot, appearance data of the target of interest, and updating the obsolete appearance model using the appearance data of the target of interest. In some implementations, the method may, in a subsequent meeting between the target of interest and a second mobile robot at a later point in time, recognizing the target of interest using the updated appearance model.

32 Claims, 11 Drawing Sheets

(51) Int. Cl.
*G06K 9/66* (2006.01)
*G05D 1/02* (2020.01)
*G06K 9/62* (2006.01)

(52) U.S. Cl.
CPC ..... *G06K 9/00369* (2013.01); *G06K 9/00664* (2013.01); *G06K 9/6255* (2013.01); *G06K 9/66* (2013.01)

(56) References Cited

U.S. PATENT DOCUMENTS

| | | | |
|---|---|---|---|
| 8,855,911 | B2 | 10/2014 | Ma et al. |
| 9,301,722 | B1 | 4/2016 | Martinson |
| 2004/0073368 | A1 | 4/2004 | Gonzalez-Banos et al. |
| 2008/0123900 | A1 | 5/2008 | Ma et al. |
| 2009/0119010 | A1 | 5/2009 | Moravec |
| 2010/0085358 | A1* | 4/2010 | Wegbreit ............. G06T 19/20 345/420 |
| 2012/0150441 | A1* | 6/2012 | Ma ..................... G01S 5/0252 701/510 |
| 2012/0185094 | A1* | 7/2012 | Rosenstein .......... B25J 13/08 700/259 |

FOREIGN PATENT DOCUMENTS

| | | |
|---|---|---|
| JP | 2011-128911 | 6/2011 |
| JP | 2012078950 A | 4/2012 |
| JP | 2014-119901 | 6/2014 |
| JP | 2015-219802 | 12/2015 |

OTHER PUBLICATIONS

Satake et al., "Visual person identification using a distance-dependent appearance model for a person following robot." International Journal of Automation and Computing 10.5, 2013 (9 pages).

Eisenbach et al., "User recognition for guiding and following people with a mobile robot in a clinical environment." Intelligent Robots and Systems (IROS), 2015 (8 pages).

Yang et al., "Enforcing Template Representability and Temporal Consistency for Adaptive Sparse Tracking." arXiv preprint arXiv:1605.00170 (2016) (8 pages).

Basilico et al., "Defining Effective Exploration Strategies for Search and Rescue Applications with Multi-Criteria Decision Making," 2011 IEEE International Conference on Robotics and Automation, Shanghai International Conference Center, May 9-13, 2011, Shanghai, CN, pp. 4260-4265.

Chumtong et al., "Vision-based Object Search in Unknown Human Environment using Object Co-occurrence Graph," Proceedings of the 2011 IEEE International Conference on Robotics and Biomimetics, Dec. 7-11, 2011, Phuket, TH, pp. 2043-2048.

Kulich et al., "Single Robot Search for a Stationary Object in an Unknown Environment," 2014 IEEE International Conference on Robotics & Automation, Hong Kong Convention and Exhibition Center, May 31-Jun. 7, 2014, pp. 5830-5835.

Martinson et al., "Auditory Evidence Grids," Proceedings of the IEEE Int. Conf. on Intelligent Robots and Systems (IROS), Oct. 2006, 6 pgs.

Martinson et al., "Noise Maps for Acoustically Sensitive Navigation," International Society for Optics and Photonics, Proceedings vol. 5609, Mobile Robots XVII, Optics East, Oct. 25-28, 2004, 11 pgs.

Samadi et al., "Using the Web to Interactively Learn to Find Objects," Proceedings of the Twenty-Sixth Conference on Artificial Intelligence (AAAI-12), Jul. 22-26, 2012, Toronto, CA, 7 pgs.

* cited by examiner

PROACTIVE ACQUISITION OF DATA FOR MAINTENANCE OF APPEARANCE MODEL BY MOBILE ROBOT

CROSS-REFERENCE TO RELATED APPLICATIONS

The present application a continuation-in-part of U.S. patent application Ser. No. 15/445,630, entitled "Observability Grid-Based Autonomous Environment Search," filed Feb. 28, 2017, the entire contents of which is incorporated herein by reference.

BACKGROUND

The present disclosure relates to autonomous computing and mobility.

Today, many autonomous computer systems rely on detection and recognition techniques for various different applications. However, for a mobile robot, the task of recognizing an object, such as a person, that may change its appearance can be challenging. Recognizing people by their face is one of the most secure and reliable vision-based biometrics available to a robotic system. Unfortunately, face-based recognition is generally subject to the positional requirement that the front of the face be visible in the image. For a mobile robot, this can be a very significant limitation, because the mobile robot might approach a detected person from any arbitrary angle, for example, the mobile robot might approach from the front where a face is visible, from the side where only part of a face is visible, or from behind where no part of the face is visible, much less the front of the face. Furthermore, determining the orientation of a sitting individual is currently very challenging, so a mobile robot cannot easily adapt its path to guarantee the presence of a face.

In some solutions to this problem, robots depend on softer, less accurate biometrics such as a person's appearance, body type, or clothing. These softer biometrics have the potential to work from behind, unlike faces, but are significantly less persistent. The accuracy of models when recognizing subjects degrades when a subject changes their appearance. This, however, is a real challenge for autonomous deployment. With current systems, until the subject with an altered appearance walks in front of the robot and is recognized by a more permanent biometric, the robot does not know that its appearance models are incorrect. Furthermore, even if the robot knew its appearance models were out of date, it currently has no way of improving the model.

Identifying objects, such as people, has been a task for surveillance video for a long time, but sufficient methods for remedying these problems for mobile robots does not yet exist. There have been a number of methods proposed over the years in various different domains that have attempted to recognize people.

Appearance models are being used for surveillance in existing technology, such as target re-identification in surveillance video. Surveillance systems are limited by their low applicability to mobile cameras and single viewpoint systems. Such systems may create appearance models when a person steps into a field of view of the camera and are typically of low quality. Accordingly, these systems are unsuitable for mobile applications where there is a higher degree of relative positional variability between a subject and the sensor.

One patent publication describing surveillance technology using appearance models is US 20080123900 A1 ('900). In '900, appearance and motion are used to associate tracklets across multiple frames and/or sequences of images. '900 attempts to overcome full or partial occlusion in single camera surveillance as a subject walks across the field of view of the camera. The system in '900 extends to multiple cameras, for instance, if their field of view overlaps. The appearance models used in '900 consists of color histograms constructed across the multiple frames of a single tracklet.

Another patent, U.S. Pat. No. 8,379,920 B2 ('920), discusses a surveillance system for model creation by first finding faces and then building color and texture histograms for clothing, and feeding clothing color as well as gender, age, and skin information into a support vector machine for identification. The appearance model in '920 patent is constructed upon entry by a person into the camera frame and can be used across multiple videos and/or cameras. A dependency on face-based registration reduces effectiveness when looking at the person from behind. In general, such surveillance-based systems assume that a person walks in front of the camera before the system constructs an appearance model. This is a highly unlikely scenario in a single viewpoint system, as may be the case with a mobile robot, and the scenario may only occur when there are a large number of cameras mounted throughout an environment.

In human robot interaction, appearance-based modeling has been used when face-to-face scenarios are not available, such as when a robot is following a person. In that situation, having an appearance-based model enables target re-acquisition when the robot loses track of their human leader. However, existing solutions do not allow a mobile robot to create and maintain its own appearance models. Such systems deployed for human robot interaction typically require a training phase during which a person stands in front of a sensor and rotates in place to show all sides of their body in order to collect sufficient data for an appearance model of sufficient quality to be used with a mobile robot. This is highly impractical for daily use, because the person must retrain the robot every time they want to use it so they may stop using the robot for small tasks.

One such appearance-based system is Satake, J., Chiba, M. and Miura, *"Visual Person Identification Using a Distance-dependent Appearance Model for a Person Following Robot,"* Int. Journal of Automation & Computing (2013) 10: 438 ("Satake"). Satake proposed a scale-invariant feature transform based model for a mobile robot that is lighting and pose invariant. Unlike surveillance systems, where models are created as the subject walks into the field of view of the camera and then updated as the subject continues across the image, this approach depends on the model being created from images of all sides of the individual's body. This may be important in re-acquiring the target from a ground-based camera, because the relative position and orientation of the person may change significantly during a gap in time. To use the system, every person of interest needed to first stand in front of the camera and rotate a full 360 degrees.

Another similarly limited system is described in M. Eisenbach, A. Vorndran, S. Sorge, and H. M. Gross, *"User recognition for guiding and following people with a mobile robot in a clinical environment,"* 2015 IEEE/RSJ International Conference on Intelligent Robots and Systems (IROS), Hamburg, 2015, pp. 3600-3607 ("Eisenbach"). Eisenbach presented an appearance-based robot following application that explored various color based appearance models in a clinical setting. Eisenbach's system used a distinct initialization phase during which images of the target were collected and processed to build the appearance model. After the appearance was created, the robot could lead or follow the target through a real environment.

A method for using an appearance model in a humanoid robotic system is described in Eric Martinson, Wallace Lawson, and J. Gregory Trafton, "*Identifying People with Soft-Biometrics at Fleet Week*," Int. Conference on Human-Robot Interaction, Tokyo, 2013 ("Martinson"). The system in Martinson was used to recognize people as part of a live interaction game. Martinson proposed the creation of appearance models after a robot looks at the subject. Models in Martinson, however, are not updated after the initial creation phase, instead being deployed immediately and discarded once the game ended. As a result, these models are less accurate in varying environmental conditions than the aforementioned approaches having dedicated training phases.

Some existing technologies include applications in which appearance models are updated gradually in response to new data and/or information about a person. However, these technologies are not sufficient, for example, for human robot interaction, as they typically require the person to step in front of the field of view of the camera, thus providing feedback about the person's current appearance. Accordingly, these models only update the appearance models during interactions between the robot and the person, thereby suffering from degradation of model accuracy and the same inconvenience to the person as described above.

For example, such technology is described in Xue Yang, Fei Han, Hua Wang, and Hao Zhang, "*Enforcing template representability and temporal consistency for adaptive sparse tracking*", International Joint Conference on Artificial Intelligence (IJCAI), 2016 ("Yang"). In Yang, a sparse-coding based algorithm is presented for learning representative features for recognition that adapt to handle variation in appearance over time. In Yang, less used appearance features are updated and less representative features are replaced.

It is desirable to address the limitations of these technologies.

SUMMARY

This document discloses innovative technology for addressing the problems in the Background. The technology can allow a mobile robot to actively search an environment and collect new data for updating appearance models, even extending to learning to predict when an individual's appearance is likely to change and proactively moving the mobile robot to update or create the appearance model.

According to one innovative aspect of the subject matter described in this disclosure, a computer-implemented method for proactive acquisition of data for creation of appearance models by a mobile robot comprises: selecting, by one or more processors, a target of interest having an obsolete appearance model, the obsolete appearance model describing a prior appearance of the target of interest; navigating a first mobile robot to a location, the first mobile robot including a mechanical component providing motive force to the first mobile robot and an image sensor; searching for the target of interest at the location including identifying the target of interest with a threshold level of confidence; collecting, in the location by the image sensor of the first mobile robot, appearance data of the target of interest; updating, by the one or more processors, the obsolete appearance model using the appearance data of the target of interest; and in a subsequent meeting between the target of interest and a second mobile robot at a later point in time, recognizing, by the one or more processors, the target of interest using the updated appearance model.

In general, another innovative aspect of the subject matter described in this disclosure may be embodied in computer-implemented methods comprising: selecting, by one or more processors, a target of interest having an obsolete appearance model, the obsolete appearance model describing a prior appearance of the target of interest; searching an environment using a mobile computing device for the target of interest, the mobile computing device including a mechanical component providing motive force to navigate the environment and a sensor to monitor the environment; collecting, in the environment by the sensor of the mobile computing device, appearance data of the target of interest; and updating, by the one or more processors, the obsolete appearance model using the appearance data of the target of interest.

In general, another innovative aspect of the subject matter described in this disclosure may be embodied in systems comprising: one or more non-transitory memories; one or more processors; one or more mobile robots including a mechanical component providing motive force to the one or more mobile robots and an image sensor; a target identifier executable to select a target of interest having an obsolete appearance model, the obsolete appearance model describing a prior appearance of the target of interest; a navigator executable to navigate a first mobile robot to a location and search for the target of interest at the location, searching for the target of interest including identifying the target of interest with a threshold level of confidence; a model updater executable to collect, in the location by the image sensor of the first mobile robot, appearance data of the target of interest and update, by the one or more processors, the obsolete appearance model using the appearance data of the target of interest; and a subject detector executable to, in a subsequent meeting between the target of interest and a second mobile robot at a later point in time, recognize, by the one or more processors, the target of interest using the updated appearance model.

These and other implementations may each optionally include one or more of the following features: that selecting the target of interest is based on a predicted probability that the obsolete appearance model of the target of interest is obsolete; the predicted probability that the obsolete appearance model of the target of interest is obsolete is based on an event detectable by the first mobile robot; the predicted probability that the obsolete appearance model of the target of interest is obsolete is based on a predicted time of an appearance of the target of interest changing; that selecting the target of interest includes predicting a likelihood that the obsolete appearance model of the target of interest is obsolete, and determining whether the likelihood that the obsolete appearance model of the target of interest is obsolete satisfies a defined threshold; after updating the obsolete appearance model using the appearance data of the target of interest, selecting a second target of interest on a target of interest list; updating, by the one or more processors, a target of interest list to indicate that the target of interest has the updated appearance model; physically moving the first mobile robot to the location by the mechanical component; searching, by the first mobile robot, for the target of interest by physically moving the first mobile robot around the location; that the location is predicted based on a history of locations where the first mobile robot has recognized the target of interest previously; that collecting the appearance data of the target of interest includes physically moving the first mobile robot around the location while collecting the appearance data until sufficient appearance data has been collected to identify the target of interest as a particular subject and update the obsolete appearance model; and that the first mobile robot and the second mobile robot are the same mobile robot.

Other implementations of one or more of these and other aspects include corresponding systems, apparatus, and computer programs, configured to perform the actions of methods, encoded on non-transitory computer storage devices.

The technology described herein is particularly advantageous in a number of respects. For instance, implementations of the technology described herein can detect and recognize a subject from a mobile robot, predict a need for new data to update appearance models, and search for a subject. The technology can provide higher quality, more accurate, and more up-to-date appearance models with better positional variability than the methods described in the Background. These and other features described in this disclosure substantially improve the accuracy and efficiency of the recognition of a subject, such as a person, by a mobile robot. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

DESCRIPTION

Figure 1A:
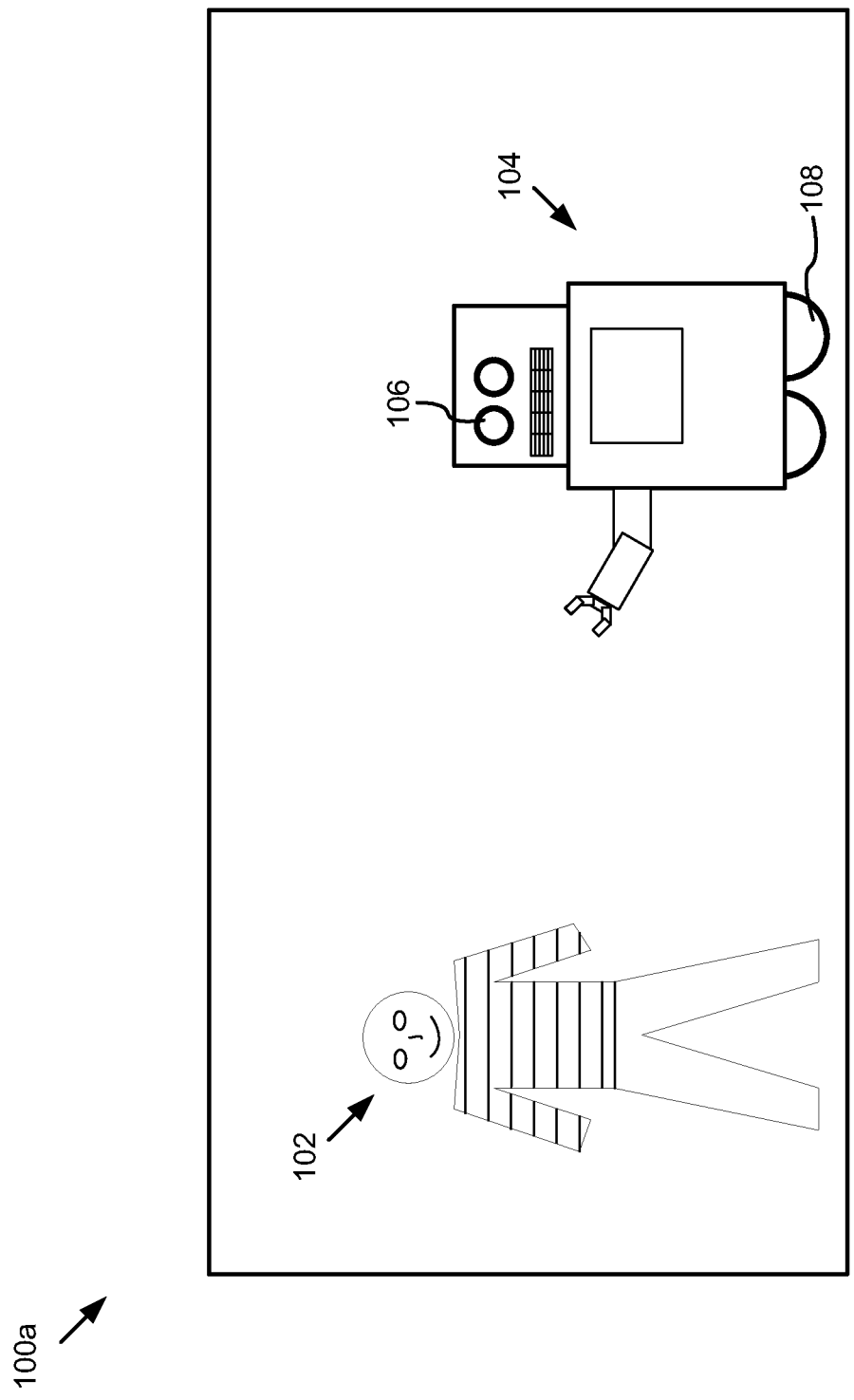
FIGS. 1A-1C are illustrations of example observable environments having a subject for which an appearance model may be updated and used.

This document discloses innovative technology for proactive acquisition of data for creation and/or update of appearance models by a mobile computing device (also referred to herein as a mobile robot 603). A mobile robot 603 may be called upon to interact with and/or recognize a person without necessarily having an ideal view of the person's face or other means of reliable identification. In such situations, the mobile robot 603 may use an appearance model describing the appearance of the person; however, because a person may change their appearance, the appearance model may quickly become obsolete. As described in the Background, some previous solutions to this problem have required that the person actively initialize their appearance model after changing their appearance (e.g., by presenting themselves in front of a camera and indicating their identity). The process of the person actively participating in updating their appearance model is cumbersome and time consuming, thereby leading to appearance models becoming obsolete when the person does not reliably participate in the initialization process or not being created in the first place. In some instances, a mobile robot 603 may be called upon to recognize a person at a given moment without advance notice. Accordingly, the techniques described herein allow a mobile robot 603 to maintain an up-to-date appearance model of a person, so that the mobile robot 603 can recognize the person without advance notice and without a clear view of the person's face.

The technology includes an appearance model management engine 635 that may learn to identify when subjects are likely to need a new appearance model, actively find the subjects likely to need a new model, and collect data for creating and/or updating the model. A subject, as used herein, is any object for which the mobile robot 603 may create an appearance model. Although, in some instances, this disclosure may refer to a subject as including a human person, it should be understood that the techniques described herein may be applicable to other subject types. An appearance model may include softer, less accurate biometrics that have the ability to be used from different angles, such as clothing, body shape, body size, skin or hair color, hair style, etc. By using a robot that can actively search an environment, some implementations of the techniques described herein can collect new data for updating appearance models and may even learn to predict when the person's appearance is likely to change and proactively move to update the appearance model of the person. Accordingly, the likelihood that the appearance model is to be up to date the next time the mobile robot 603 is called upon to recognize and/or interact with the person is increased. It should be noted that, in various implementations of the techniques described herein, whether the appearance model management engine 635 creates or updates appearance models may depend on a type of model, whether a model previously existed, and whether the appearance of the subject has changed. Accordingly, the terms "update" and "create" are used interchangeably throughout this disclosure.

Among other benefits, the appearance model management engine 635 may build better quality and/or more up-to-date appearance models, so that the appearance models can be used in varying situations and from varying angles. In some implementations, a mobile robot 603 may use the techniques described herein to actively move about an environment/ location to collect more data to update appearance models. In some implementations, the appearance model management engine 635 may determine subjects for which to update the appearance models. This is advantageous as it can, in some cases, limit the amount of continuous roaming and updating of appearance models.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1A is an illustration of an example observable environment 100a (environment 100a and 100b may be referred to as 100) having a subject/person 102 for which an appearance model may be created and/or used. As illustrated in FIG. 1A, a mobile robot 104 may recognize the person 102, for instance, using facial recognition or an existing appearance model based on information received via an image sensor 106 (e.g., a sensor 655). In some implementations, the mobile robot 104 may create an appearance model for the person 102. For the purposes of this description, a mobile robot (104 or 603) may be any mobile computing device having both a propulsion system 108 and one or more sensors 106 for collecting appearance data and recognizing subjects.

In some implementations, map data of the environment 100 may be fully or partially known. The map data may represent obstacles (e.g., walls, furniture, etc.), typical locations of subjects, etc., as described in further detail elsewhere herein. In some instances, the map data may include historical locations of subjects (e.g., the person 102) and likelihood values for the positions and/or angles at which the mobile robot 104 is likely to observe the same subjects.

Figure 1B:
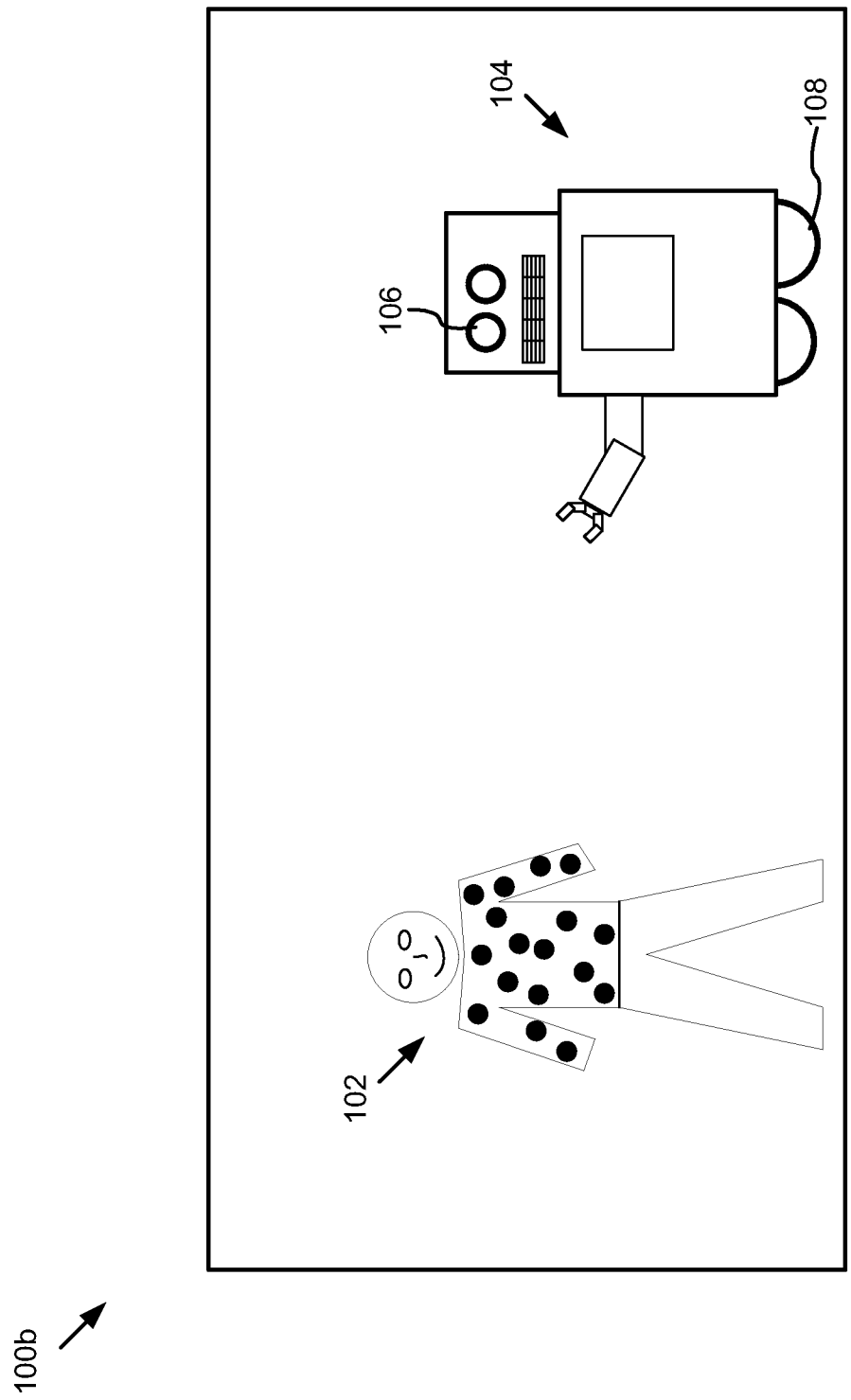

FIG. 1B is an illustration of an example observable environment 100b in which the person 102 has changed their appearance. In the example, the person 102 may be wearing a striped shirt in the interaction in FIG. 1A; however, in FIG. 1B, which may occur at a later time, the person 102 may be wearing a dotted shirt. The mobile robot 104 may predict a time at which the appearance of the person 102 has likely changed and therefore the appearance model of the person is obsolete. At the predicted or defined time, the mobile robot 104 may search for the person 102, identify the person 102 within a threshold level of confidence, and collect appearance data for the person 102. In some implementations, the mobile robot 104 may move around the environment 100b to collect additional appearance data with different lighting, angles, positions, etc. The mobile robot 104 or a remote server (not illustrated) may use the collected appearance data to create an appearance model for the person 102.

Figure 1C:
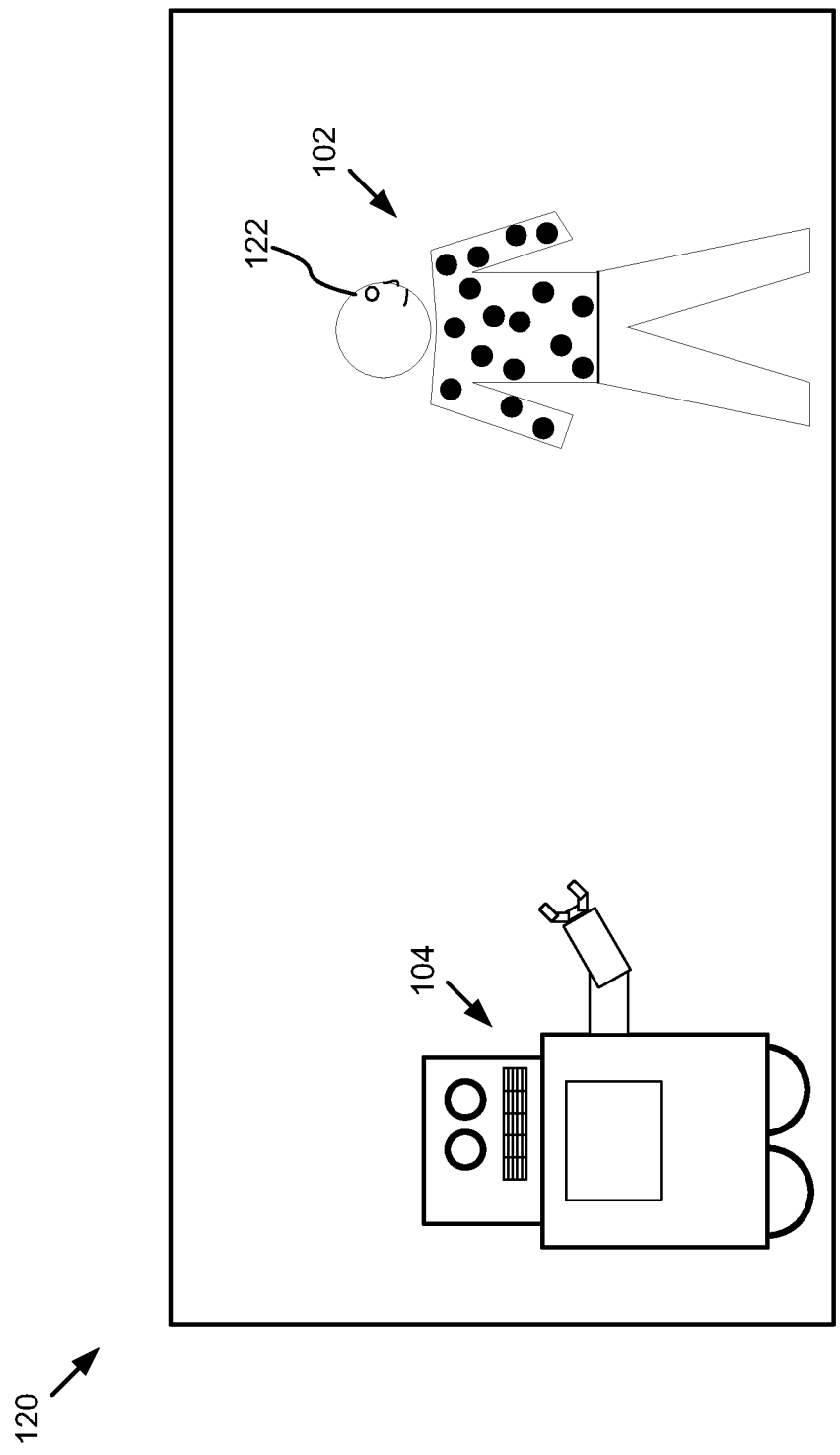

FIG. 1C is an illustration of an example observable environment 120 in which the person 102 cannot be reliably identified by the mobile robot 104, because, for example, the person's 102 face 122 is obscured. As illustrated in FIG. 1C, the mobile robot 104 may be called upon to recognize the person 102. The mobile robot 104 may know with a threshold level of confidence the identity of the person 102 based on the appearance model (e.g., based on the probability that the appearance model is obsolete, the completeness of the appearance model, and other metrics, etc., as described herein). In some instances, the mobile robot 104 may use the recognized identity of the person 102 to interact with the person 102.

Figure 2:
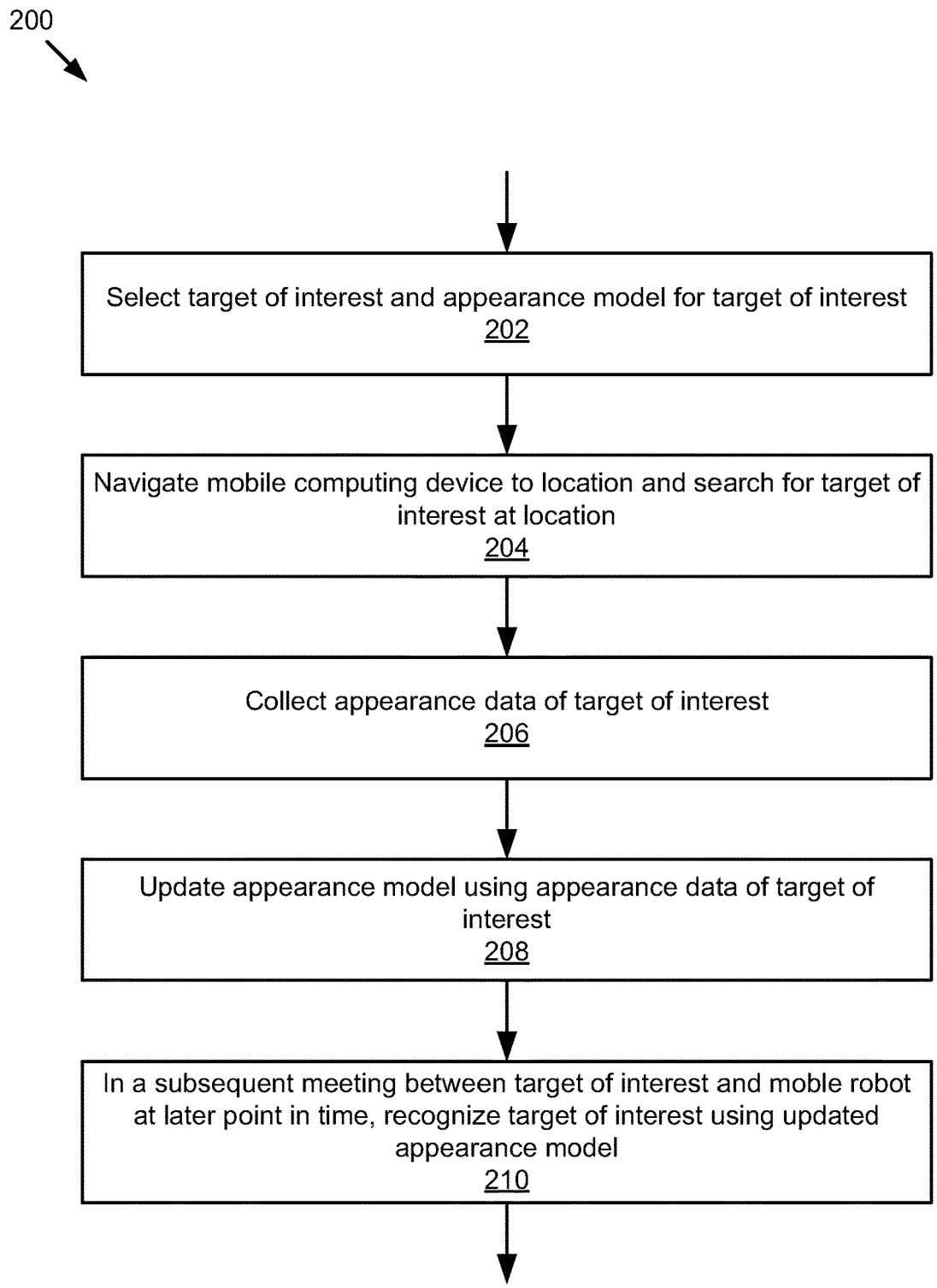
FIG. 2 is a flowchart of an example method for proactive acquisition of data for creation of appearance models by a mobile robot.

FIG. 2 is a flowchart of an example method 200 for proactive acquisition of data for creation of appearance models by a mobile robot 603. At 202, the target identifier 702 may select a target of interest and an appearance model for the target of interest. In some implementations, the target identifier 702 may retrieve or receive, for a subject (e.g., a person), an appearance model, or information pertaining thereto, such as whether the subject has an appearance model, the likelihood that the appearance model is up-to-date, etc. For instance, the target of interest may include a subject for which it is determined to update the appearance model based on the appearance model being obsolete (e.g., having a defined probability of being obsolete, as described elsewhere herein). For example, the target identifier 702 may identify a subject for which to update or create an appearance model and may classify this subject as the target of interest or may place the subject on a list of targets of interest.

In some implementations, determining a target of interest may include predicting the likelihood that the appearance model of a subject is obsolete, for instance, based on the likelihood that the appearance model satisfies a defined threshold, and classifying the subject as a target of interest for which to update an appearance model. For example, the target identifier 702 may classify a subject as a target of interest based on an elapsed or defined time, a predicted probability that the appearance of the subject has changed, a detectable event, etc.

In some implementations, determining the target of interest may be based on a predicted probability that the appearance model of the subject is obsolete (e.g., out of date, no longer representative of the appearance of the subject, etc.). For example, the predicted probability that the appearance model of the person is obsolete may be based on a predicted time that the physical appearance of a subject, such as a person, will change.

In some implementations, the target identifier 702 identifies the subject or set of subjects for which to update or create an appearance model (e.g., the targets of interest), based on a defined update time. A defined update time may be a set time at which the target identifier 702 assumes one, some, or all appearance models for one or more subjects should be updated. Because people frequently change their appearance/clothing daily, the defined update time may occur daily (e.g., in the morning after subjects become available for an update). For example, the target identifier 702 may accordingly direct the mobile robot 603 (e.g., using the model updater 706) to create or update appearance models for each subject with which it interacts in the morning before the mobile robot 603 is called upon to use appearance model-based recognition with a particular subject. In some implementations, the target identifier 702 may determine an order in which to create or update appearance models based on the time of day that the mobile robot 603 typically interacts with the subject, so that the number of subjects having an updated appearance model is maximized at the time the mobile robot 603 is called upon to recognize each subject.

In some implementations, multiple defined update times may be specified per day (or week, month, hour, or some other period), so that the model updater 706 creates or updates the appearance models multiple times each day.

In some implementations, the defined update time and/or the predicted probability that the appearance model of the subject is obsolete may be determined based on a statistical approach. For example, the appearance model management engine 635 may use and/or create a database of past interactions between the subject and the mobile robot 603 and/or another system or robot with which the subject interacts. The target identifier 702 may use the database to make predictions about a subject's likelihood of having changed its appearance. The appearance model management engine 635 may be configured to determine, based on past or current interactions, whether a subject has changed its appearance and save indications of these instances in the database in association with the subject and/or appearance model.

In some implementations, the target identifier 702 may start with a simple probability model where it assumes that the appearance of a subject changes a defined number of times within a time period. For example, the target identifier 702 may start by assuming that a particular person changes their appearance four times per day (e.g., removes a jacket, changes clothing, etc.). At each of these defined times, the mobile robot 603 may search for the subject, collect appearance data, and, if the subject's appearance has changed since the previous interaction, update/create the subject's appearance model. While this assumption will likely result in extra data collection initially, the target identifier 702 may adapt the probability model after a defined period, quantity of interactions, and/or based on how frequently the appearance model management engine 635 determines that the subject's appearance has actually changed. This adaptation allows the target identifier 702 to more accurately determine the likelihood that the subject's appearance has changed at a given point during the time period. In some instances, the appearance model management engine 635 may vary the defined times at which the mobile robot 603 collects data for the user while generating or updating the probability model. For instance, each of the defined times may be at a different time of the day or in response to detected events (e.g., as described elsewhere herein), etc.

Figure 8:
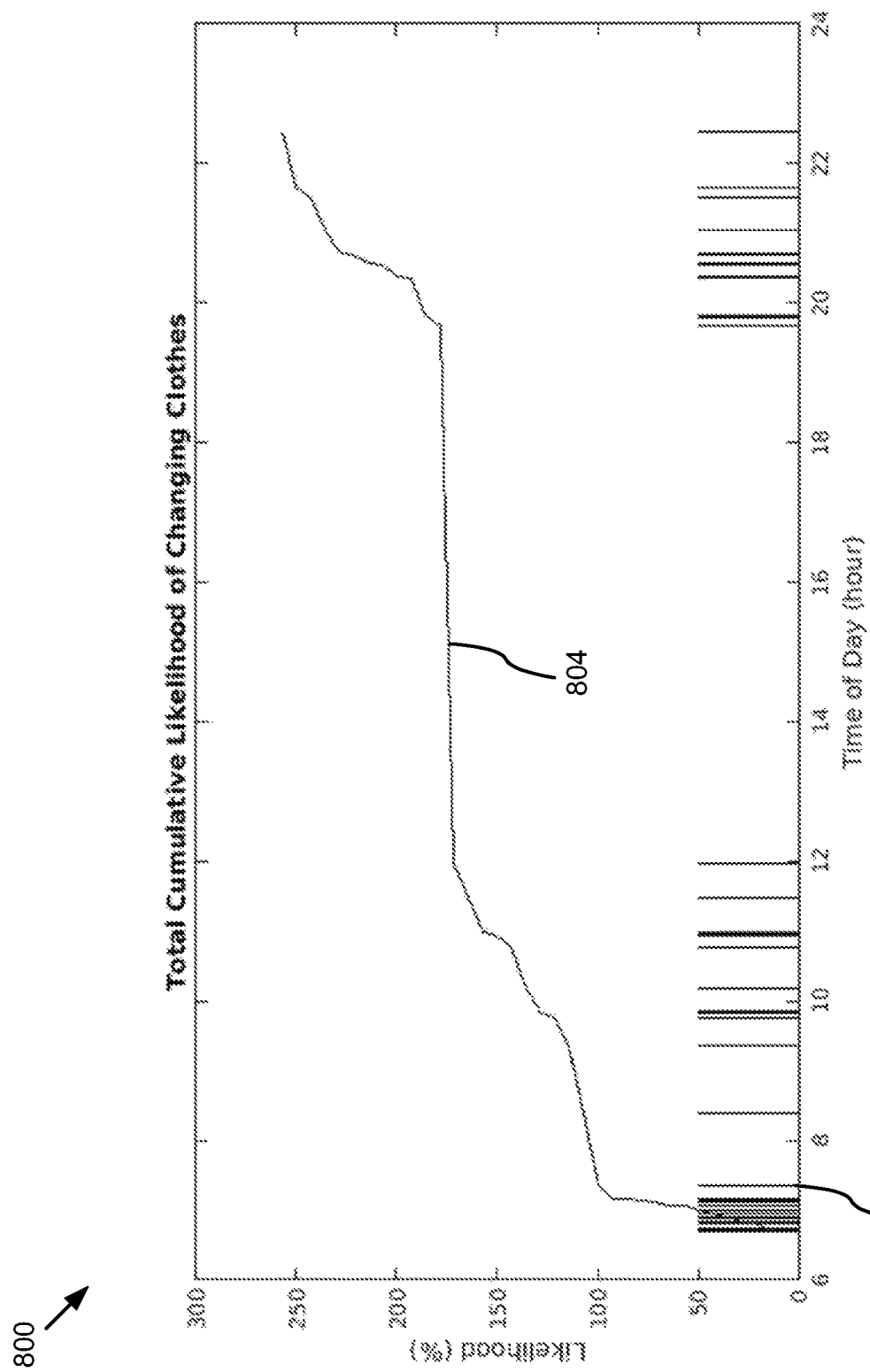
FIGS. 8 and 9 depict charts of example predicted likelihoods.
Figure 9:
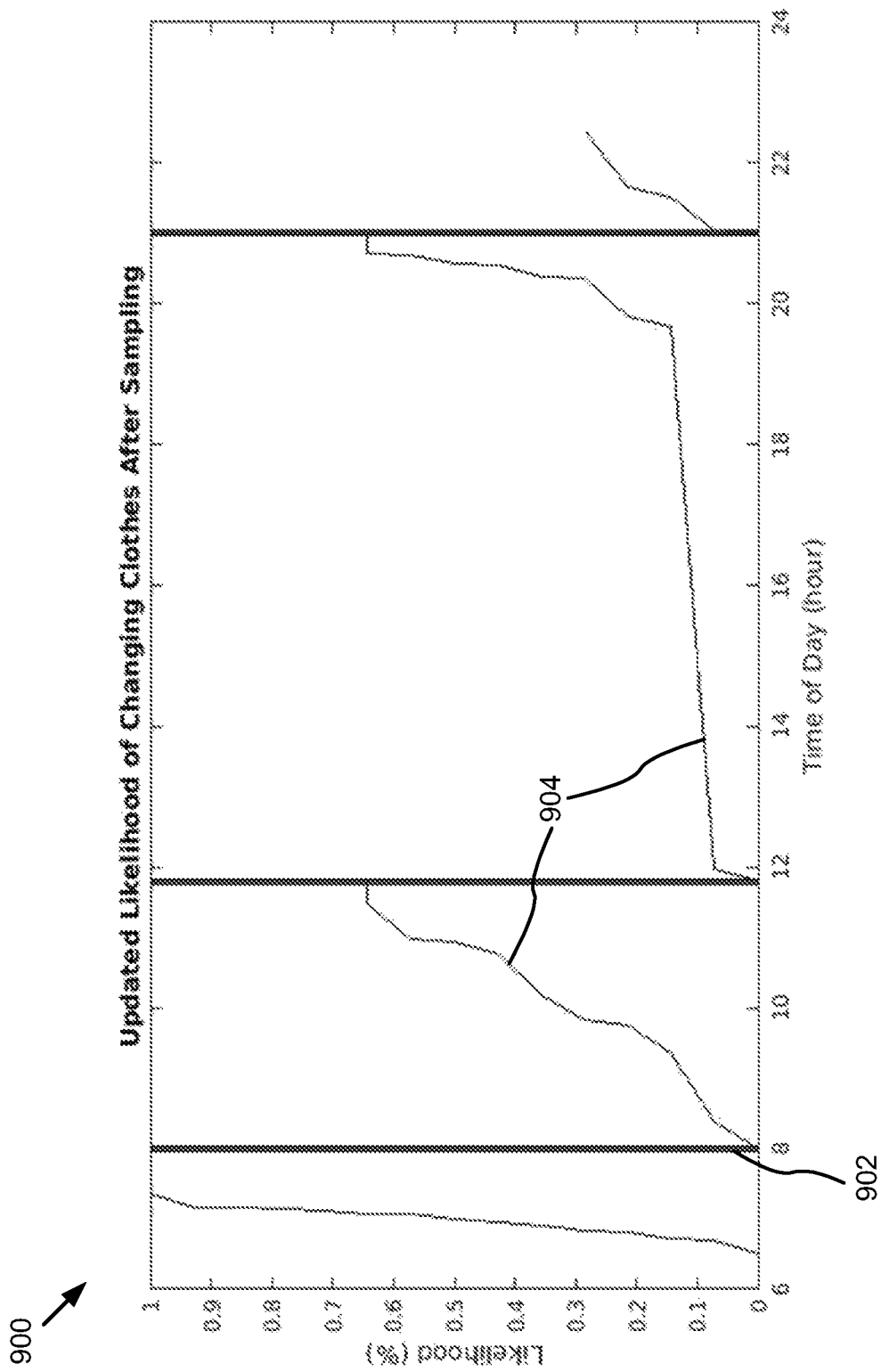

The target identifier 702 may use the probability model to estimate the likelihood of the subject's appearance changing against the time of the day. An example chart 800 of this likelihood is illustrated in the example in FIG. 8. Chart 800 illustrates an example predicted probability/cumulative likelihood of a subject/person's appearance changing (and therefore of the appearance model becoming obsolete) versus the time of day. The bars 802 represent the times at which the mobile robot 603 has observed deviations from the existing appearance model for the particular person (e.g., while creating or updating a probability model) and the line 804 represents the cumulative likelihood as the day progresses. Note that, in this non-limiting example, the cumulative likelihood in chart 800 reaches more than 100%. This is because the person for which the probability is modeled changes their clothes every morning (100% likelihood), often during the day (71% likelihood) and again in the evening before going to bed (86% likelihood). In response to the cumulative likelihood satisfying a predetermined threshold, the target identifier 702 may designate the person as a target of interest and/or add the person to a targets of interest list. The appearance model management engine 635 may seek to create a new appearance model for the person or update a previously created appearance model for the person, for example, using the techniques described herein. After a new appearance model is created or updated, the likelihood distribution may be reset to an initial value (e.g., 0), creating a running distribution that resembles the example illustrated in chart 900 depicted in FIG. 9.

Chart 900 illustrates that the predicted probability/cumulative likelihood of the appearance model is obsolete is reduced after each instance that the mobile robot 603 successfully finds a subject and creates/updates the subject's appearance model, for example, as described below. In this non-limiting example, each vertical bar 902 in chart 900 represents a time at which the robot collects new data and updates the appearance model, as discussed in further detail elsewhere herein. The line 904 represents the probability/cumulative likelihood of the appearance model being obsolete.

In some implementations, where the mobile robot 603 may be called upon to interact with or otherwise recognize a subject using an appearance model on a regular basis, all, or a set of, potential subjects may be evaluated based on their predicted probability of having an obsolete appearance model to determine, for example, an order or timing in which to collect appearance data to create/update the appearance models of the potential subjects.

In some implementations, the predicted probability that an appearance model of a particular subject is obsolete may be an event-based initialization, for example, the probability may be based upon the occurrence or time of a detectable event or sequence of detectable events. Detectable events may include any events that may be detected by the mobile robot 603 or a sensor or system communicatively coupled to the mobile robot 603. For example, people tend to change clothes before or after certain events, such as the person entering a building from outside, leaving a building, entering a hot or cold room, leaving a hot or cold room, bathing, swimming, exercising, brushing their teeth, sleeping, attending church, etc. The mobile robot 603 and/or appearance model management engine 635 may be configured to detect discrete events or sequences of events and identify when changes in appearance occur before and/or after certain events. For instance, the target identifier 702 may detect that a person has entered a building from being outside during cold weather (e.g., as determined by the target identifier 702 using dates, weather information received from the Internet, or data from internal sensors) and that the person typically waits five minutes before changing appearance, such as removing an overcoat. Accordingly, the mobile robot 603 can learn to identify whether and how likely changes in appearance are to occur in correlation detectable events and how long for mobile robot 603 to wait after an event before trying to collect appearance data for the subject. The probability model learning process for detectable events may be performed in the same way as previously described regarding defined update times.

It should be noted that event-based initialization can be run instead of, or in parallel with the defined time based probability model learning. In some implementations, the target identifier 702 may run these processes in parallel, because certain events are associated with a change of appearance (e.g. taking a shower), but time of day based updates can learn general trends not easily associated with an event. If these processes are run in parallel, there are multiple methods for fusing decision systems available, such as a fused likelihood score (e.g. sum of log likelihoods) or a winner takes all strategy (e.g. if either process suggests the mobile robot 603 should check now, the mobile robot 603 may move to update its appearance models for the subject).

Returning to FIG. 2, at 204, the navigator 704 may navigate the mobile robot 603 to a location and search for the target of interest at the location. For example, the mobile robot 603 may include an image sensor (e.g., a sensor 655) and a mechanical component (e.g., the propulsion system 657) that may provide a motive force to move the mobile robot 603 to a designated location. In some implementations, the navigator 704 may provide an instruction to the mobile robot 603 to physically move to a designated location.

In some implementations, searching, by the mobile robot 603, for the target of interest may include physically moving the mobile robot 603 around (e.g., about, within, etc.) the location based on an instruction and identifying the target of interest in the location with a threshold level of confidence. For example, once a target of interest is identified and/or a target of interest list has been assembled, the mobile robot 603 may autonomously move around to find a subject. This process could be a random walk, a patrolled route, a predicted location based on a history of locations where the mobile robot 603 has recognized the target in the past, or another method based on prior interaction histories. One such method is described in U.S. patent application Ser. No. 15/445,630, entitled "Observability Grid-Based Autonomous Environment Search," filed Feb. 28, 2017, from which this application claims priority and which is incorporated herein by reference in its entirety.

Figure 3:
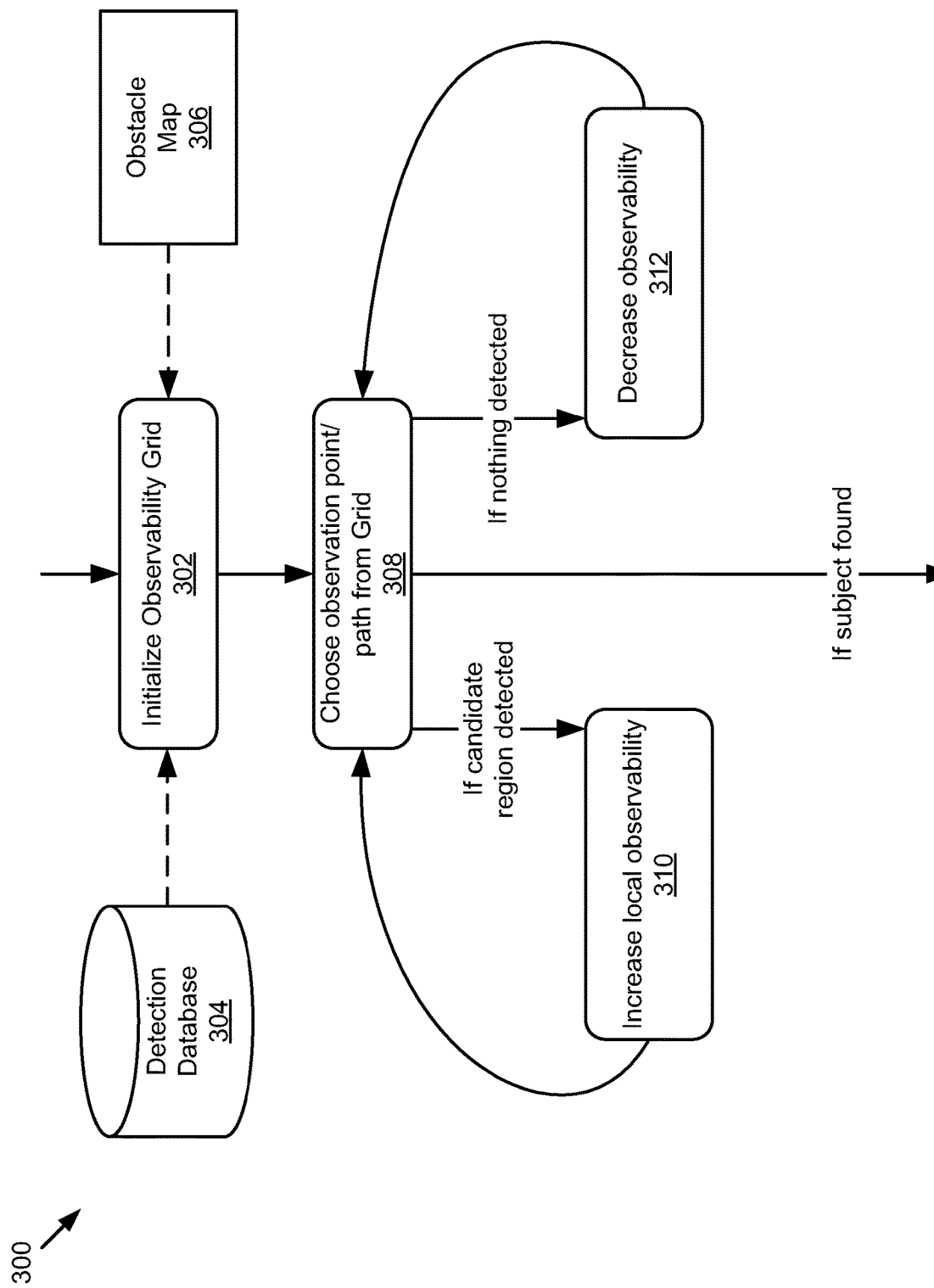
FIG. 3 is a flowchart of an example method for observing target subjects using an observability grid by a mobile robot.

FIG. 3 is a flowchart of an example method 300 for observing target subjects using an observability grid by a mobile robot 603. Additional details and methods of finding and recognizing the target in an environment, for example, based on an observability grid, are described in U.S. application Ser. No. 15/445,630. An observability grid may include a grid map of observation likelihoods describing the likelihood that a subject or an obstacle may be located at a given point and/or angle on the observability grid.

At 302, the appearance model management engine 635 may initialize an observability grid using data received from a detection database 304 and an obstacle map 306. For instance, the observability grid may be initialized with an observation likelihood distribution for an environment being navigated by a semi or fully autonomous mobile robot 603. The observation likelihood distribution may be based on information pertaining to when and where subjects have been detected in the past as stored in the detection database 304 and the location of obstacles (walls, doors, furniture, etc.) stored in the obstacle map 306. In some implementations, an observability grid may also include contextual data indicating positions and/or angles from which objects have been detected in the past. The observation likelihood distribution may be built and/or updated as the mobile robot 603 moves around an environment during a training phase, regular operation, or during a search for a target of interest, for example.

At 308, the appearance model management engine 635 may choose an observation point or path from the observability grid. For example, in some implementations, an observation point can be selected based on the most likely (e.g., based on past interactions) location at which the mobile robot 603 may observe a subject/target of interest while also avoiding obstacles.

If a candidate region is detected, the appearance model management engine 635 may increase local observability at 310. If nothing (e.g., no subject) is detected, the appearance model management engine 635 may decrease local observability at 312. For instance, upon computing an observation, the appearance model management engine 635 may determine whether one or more target objects were detected, and based upon the determination, may update the observability grid positively or negatively.

There may be a variety of situations for which local observability may be increased. In some cases, the determination to increase local observability may depend on the target for which the mobile robot 603 is searching. For instance, the appearance model management engine 635 may detect a person at a given location, but cannot identify them or collect sufficient appearance data from its current position. In that case, the appearance model management engine 635 may seek a new observation position in the vicinity of the target subject. The new observation point may be at a closer distance, a different angle, a combination of the foregoing, etc. In a further example, because the mobile robot's 603 sensor(s) 655 may not in some cases be able to expand their field of view or range, the sensor(s) 655 may be unable to capture data reflecting the appearance of the subject if situated too closely to the subject (e.g., may detect partial, obfuscated, or out-of-focus data, etc., that is insufficient to identify the target object). In such a case, the appearance model management engine 635 may increase the observability around and pointed at the detected subject, for example, by moving to another observation point.

If the subject is found the process 300 may exit, for example, because a separate persistent biometric, apart from a potentially outdated appearance model, may be used to establish a person's identity to within an acceptable level of confidence (e.g., based on satisfaction of a threshold level of confidence). Face recognition, for instance, provides a high accuracy validation of an individual's identity. As discussed above, recognizing a person's face can be difficult for a mobile robot 603 because of relative camera positioning, but the selected search strategy could overcome this limitation at the expense of time, as discussed in more detail in U.S. application Ser. No. 15/445,630.

Other than face recognition, the subject detector 708 may use other biometrics based on interaction histories, including the use of contextual data (e.g. location based likelihoods of a person's identity) and/or long-term clothing models indicative of general clothing color tendencies (e.g. this person likes to wear dark clothing), for example, or the mobile robot 603 may even ask a person their name to establish identity. These methods, along with other soft biometrics, are less accurate in establishing identity, but may be used to speed up search, and depending on the application and the environment, they could also be good enough for identification themselves (e.g., if within a threshold level of confidence). In some instances, the reliability of the biometric used during search can be included as a probability when estimating an appearance-based identity score or level of confidence.

The output of the method 300, whether using a single modality highly accurate system or a collection of multiple soft biometrics, may include the location of one or more of subjects (e.g., people) indicated in the targets of interest list and the level of confidence/confidence score in the subjects' identities. If the mobile robot 603 failed, in the method 300, to find any targets, or no targets are remaining, then the active update process of 300 exits.

Returning to FIG. 2, at 206, once a target of interest has been found by the mobile robot 603 (e.g., at the location to which the navigator 704 navigated the mobile robot 603), the model updater 706 may collect appearance data of the target of interest and/or each target of interest on the list of targets of interest, depending on the implementation. The mobile robot 603 may direct a sensor (e.g., a still camera, video camera, infrared camera, etc.) at the subject to collect the appearance data. The collected appearance data may be associated with the location, time, context, associated events, etc., corresponding to the collection of the appearance data. The collected data, along with the subject's identity, level of confidence (e.g., in the subject's identity, accuracy of the appearance data, etc.), may be stored in a database, file, memory, etc., or used to create or update the appearance model in real time.

In some implementations, if the quantity and/or utility of the collected data is inadequate (e.g., as described elsewhere herein), then the model updater 706 may change the position of the mobile robot 603 respect to the target of interest's location. As described above, in some implementations, collecting the appearance data of the target of interest includes physically moving the mobile robot 603 around the location while collecting the appearance data until sufficient appearance data has been collected to identify the target of interest and update the appearance model. For example, the model updater 706 may move the mobile robot 603 to a new position/angle from the subject according to a random motion in the vicinity of the target of interest, according to a preprogrammed pattern (e.g., following a set of waypoints in a circular pattern), using an observability search with an already detected target (e.g., as described in U.S. application Ser. No. 15/445,630), based on an angle poorly represented in the appearance model, etc. For example, the mobile robot 603 may detect a human pose of a person and actively move to an angle that is unobserved or poorly represented in the appearance model of the person (e.g., to collect data pertaining to the appearance of the person from the front, side, or from behind).

In some implementations, after collecting sufficient appearance data to create/update the appearance model, the target identifier 702 may determine a second target of interest on a target of interest list. The target identifier 702 may update a target of interest list to indicate that the target of interest has an updated appearance model. For instance, the target of interest list may include targets of interest ranked based on probability that the appearance models of the targets are out of date, the proximities of the targets to the mobile robot 603, etc. Once a particular target of interest has had its appearance model created/updated, the probability of the appearance model being obsolete drops, as illustrated in Graph 2, and the order or composition of the target of interest list may be modified accordingly. For instance, a target of interest list may include subjects having a threshold probability of an obsolete appearance model, although other implementations and criteria are possible and contemplated, such as a threshold priority (e.g., a defined importance that a particular subject has an up-to-date appearance model).

At 208, the model updater 706 may update or create the appearance model of the target of interest using the collected appearance data of the target of interest. Appearance model creation or updating using the collected data can be performed immediately upon appearance data collection or may be deferred to some later time depending upon the speed of the model creation/update process. With some models, such as color histograms, the creation of an appearance model may consume minimal computational time (e.g., less than one second) per model, and therefore can be created rapidly, for example, in real time.

Accordingly, in some implementations, in order to update and/or modify search parameters, once sufficient data has been collected to create/update the appearance model, the updated target of interest list may be passed back to the target identifier 702 or navigator 704 to move to the next target of interest.

At 210, in a subsequent meeting or interaction between the subject and the mobile robot 603 (e.g., the same or a different mobile robot 603 as the mobile robot 604 that collected the appearance data above) at a later point in time, the subject detector 708 may recognize the subject (e.g., the target of interest for whom the appearance model was created/updated) using the appearance model. For example, at a given moment, the mobile robot 603 may be called upon to interact with a person and may use the appearance model to recognize the person.

Figure 4:
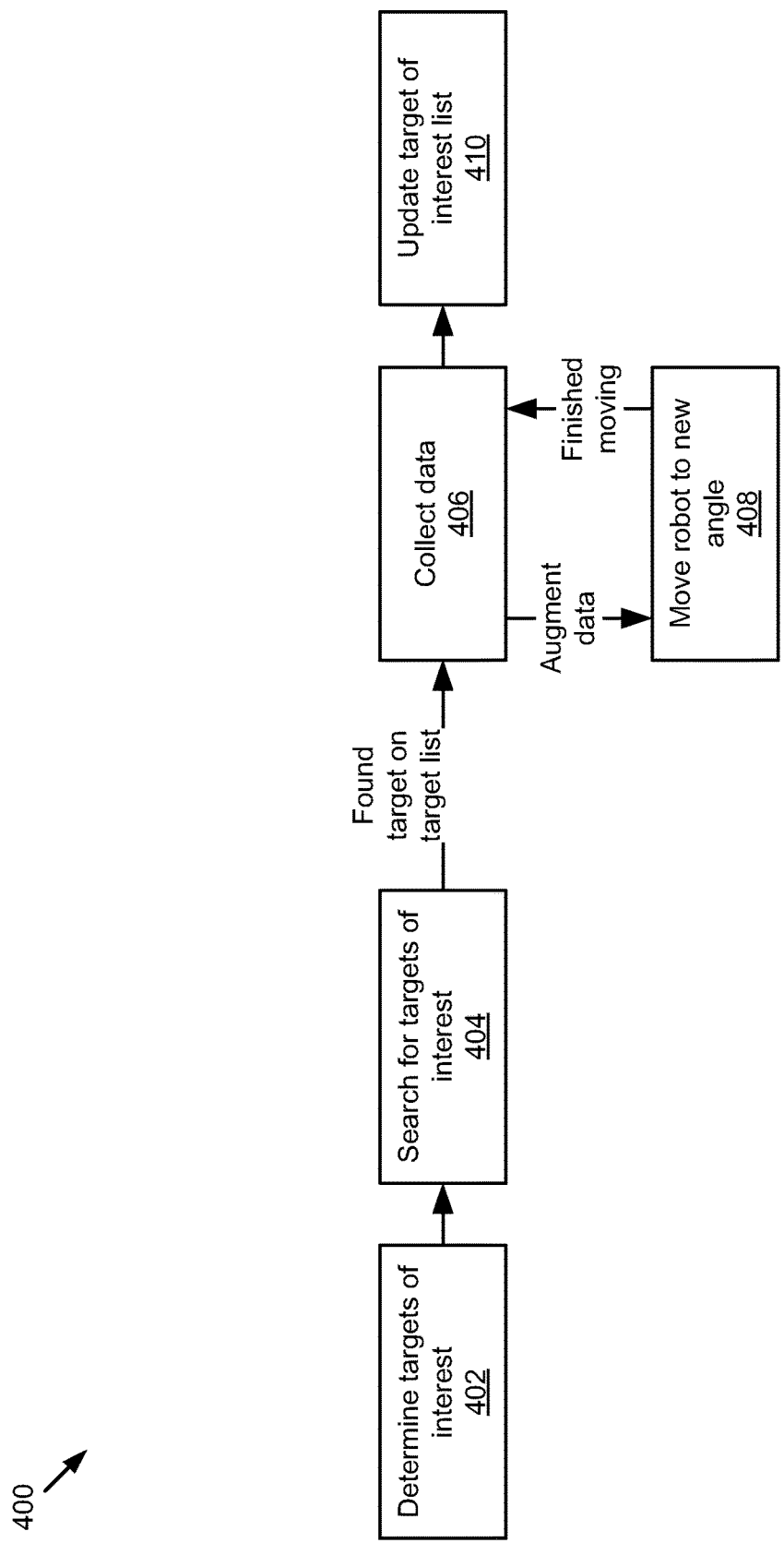
FIG. 4 is a flowchart of an example method for linear proactive acquisition of data by a mobile robot for creation of appearance models.

FIG. 4 is a flowchart of an example method 400 for linear proactive acquisition of data by a mobile robot 603 for creation of appearance models. The linear configuration may comprise five discrete steps after beginning the update routine as illustrated in the example method 400. The method 400 and/or its operations can be executed repeatedly in the background, or may be exited at any time (such as after the target of interest list is cleared) to minimize processing power being consumed. The operations of the method 400 include the same or similar details and features as are described above. Accordingly, these details will be omitted in the description of FIG. 4, which focuses primarily on a defined linear order of operations.

At 402, the target identifier 702 may determine one or more targets of interest for which to update appearance models. At 404 the navigator 704 may move the mobile robot 603 to search for the identified targets of interest, for example, using the observability grid method described in reference to FIG. 3. At 406, in response to finding a target of interest, the model updater 706 may collect data (e.g., appearance data, location, time, identity, etc.) and use the collected data to augment information pertaining to the target of interest, such as probability that the appearance model is obsolete, typical appearance (e.g., a preferred clothing or hair style), typical location at which the subject may be found, etc., as described elsewhere herein, and/or update or create an appearance model for the subject.

The model updater 706 and/or navigator 704 may move the mobile robot 603 to a new angle or position at 408 at which point the model updater 706 may collect additional data to provide further accuracy or completeness to the appearance model, level of confidence in the target of interest's identity, etc. Once sufficient data (e.g., based on a satisfied threshold completeness of the appearance model, level of confidence in subject identity, etc.) has been collected, the target identifier 702 may update the target of interest list at 410 based on updated probabilities that the appearance model(s) are obsolete.

Figure 5:
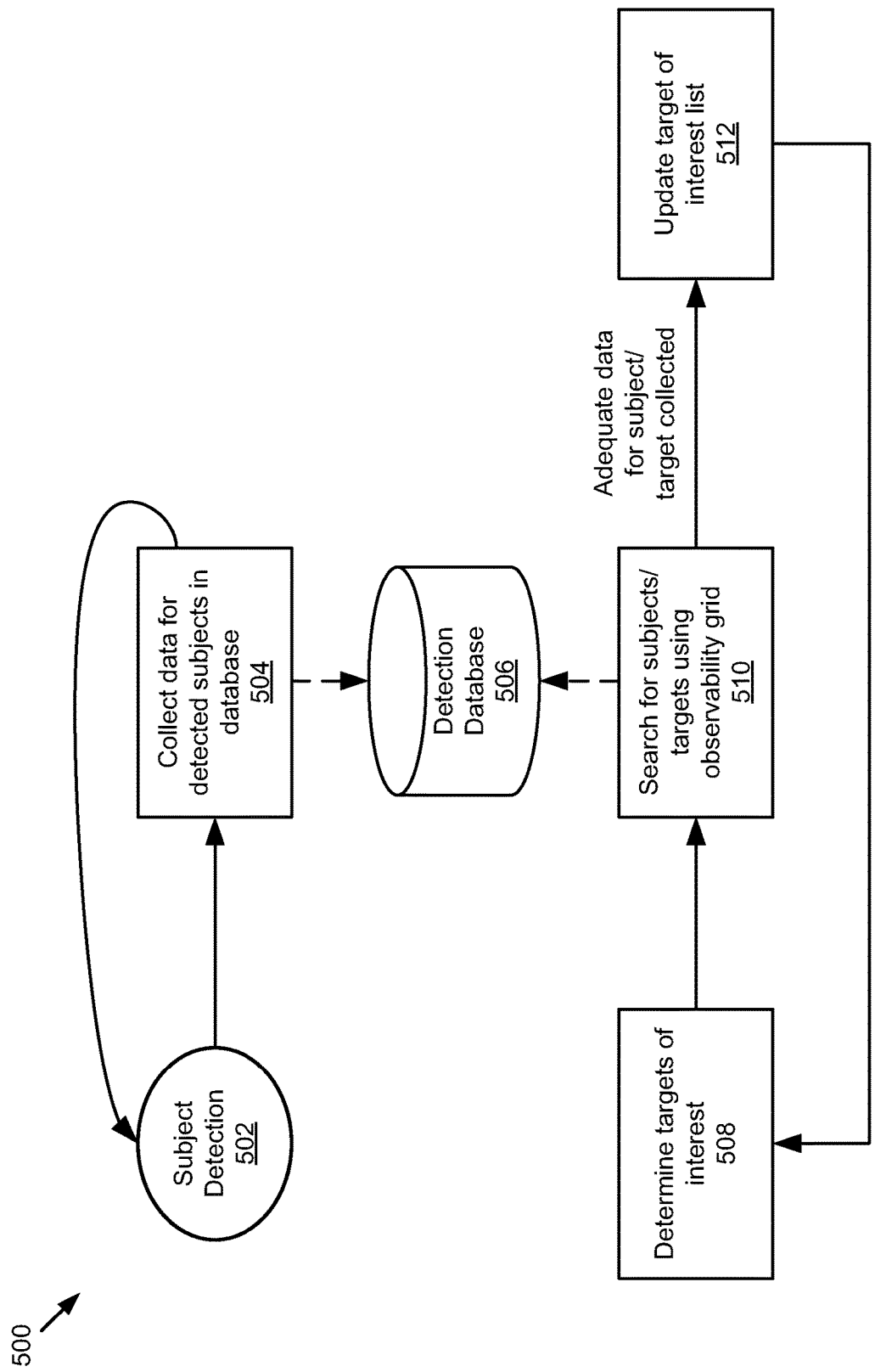
FIG. 5 is a flowchart of an example method for parallel proactive acquisition of data by a mobile robot for creation of appearance models.

FIG. 5 is a flowchart of an example method 500 for parallel proactive acquisition of data by a mobile robot 603 for creation of appearance models. In some implementations, the example data collection configuration illustrated in FIG. 5 may be used to collect data and update/create appearance models for all or a set of detected subjects. For instance, the appearance model management engine 635 may execute the operations according to the method 500, so that, instead of collecting data only after a subject has been found, sensor data for detected subjects may be continuously saved to a database. The operations of the method 500 include the same or similar details and features as are described above. Accordingly, these details will be omitted in the description of FIG. 5.

According to the method 500, instead of finding a person, then collecting data, then moving the robot to collect more data, the mobile robot 603 may continuously collect data about all or a defined set of subjects that it detects in the environment and may store the collected data in a database, filesystem, memory, etc., for retrieval and use at some point in the future. While the mobile robot 603 searches for people, it may update the database with the recorded identifications and levels of confidence. For instance, techniques described in FIG. 5 or U.S. application Ser. No. 15/445,630 may replace the need for a separate step for moving the mobile robot 603. For example, if the appearance model management engine 635 is configured to search for a subject until it collects adequate data, it may cause the mobile robot 603 to automatically circle the subject to collect data from a variety of viewing positions. In some implementations, the collected data may be labeled with additional data, such as the estimated level of confidence of the identity of the detected subject either continuously during collection or after sufficient data have been collected and the search for a particular subject is terminated.

As illustrated in blocks 502 and 504, the appearance model management engine 635 may detect subject(s) and collect data for the detected subjects in a database, such as the illustrated detection database 506. For example, as discussed elsewhere herein, a mobile robot 603 may search for subjects, map an environment, interact with or otherwise recognize subjects, or perform other tasks. While the mobile robot 603 is performing these other tasks it may detect subjects, identify the subjects, and collect data (e.g., appearance data) for the subjects, whether or not those subjects are identified as targets of interest.

In some implementations, the appearance model management engine 635 may determine targets of interest at 508, search for subjects/targets of interest (e.g., using an observability grid) at 510 and, when adequate data for the subject/target of interest is collected, update the target of interest list at 512. These operations can be performed in parallel with the detection and data collection steps at 502 and 504. For example, after the data has been established in the detection database 506, the process may resume as described above, removing the detected subject from the target of interest list, updating search parameters, and returning to the search routine.

Figure 6:
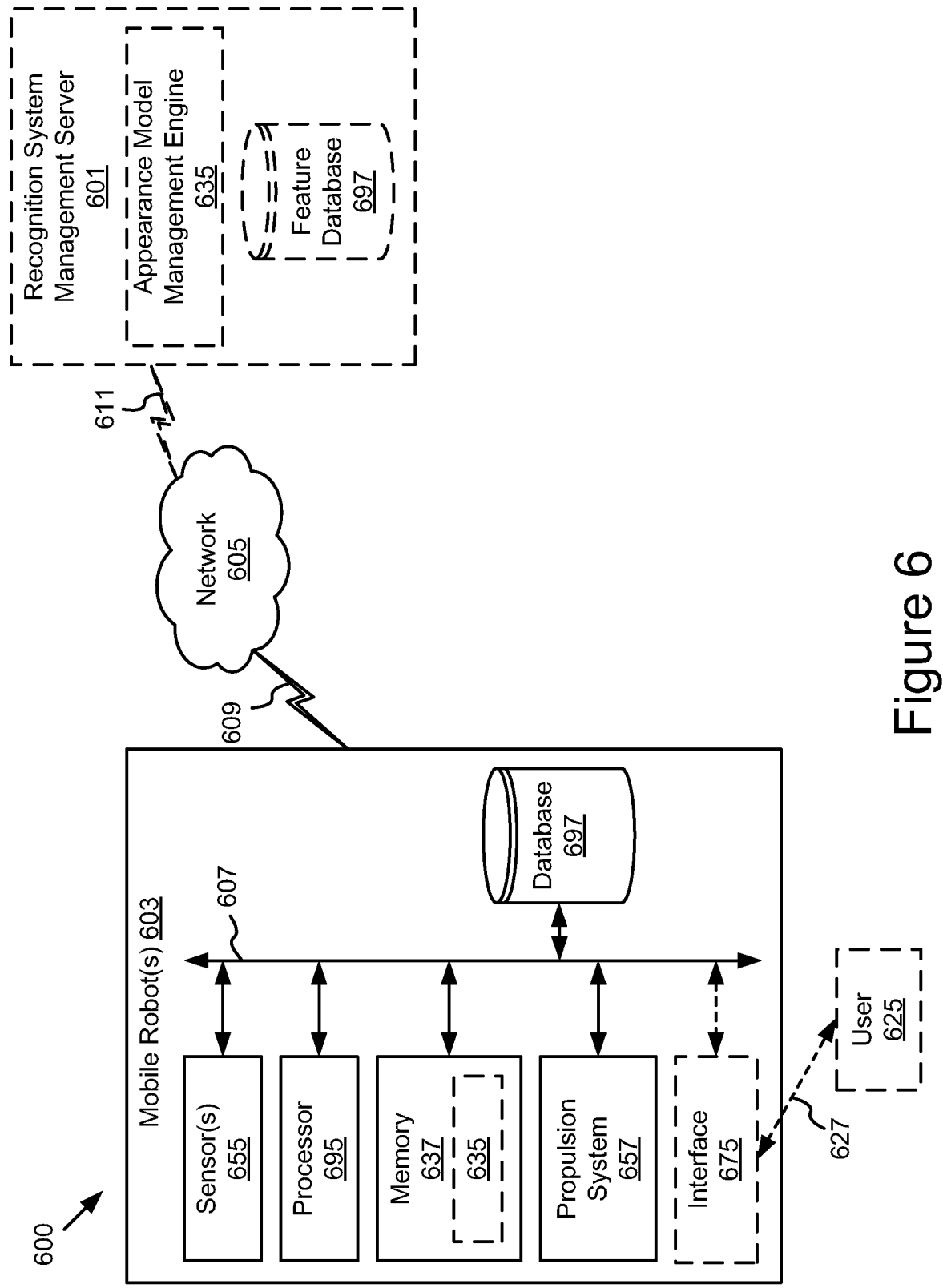
FIG. 6 is a block diagram of an example system.

FIG. 6 is a block diagram of an example system 600 for autonomous subject recognition and proactive acquisition of data for creation of appearance models by a mobile robot 603. As illustrated, the system 600 may include a recognition system management server 601 and/or a mobile robot(s) 603 that may be accessed and/or interacted with by a user 625 (as depicted by line 627). Depending on the implementation, computation may be distributed across and/or dynamically shifted between two or more computing systems (e.g., the recognition system management server 601 and the mobile robot 603, two or more mobile robots 603, etc.), may be performed independently by the mobile robot 603, etc. As such, the system 600 may or may not include a recognition system management server 601.

In implementations where a recognition system management server 601 is included, the mobile robot 603 and the recognition system management server 601 may be communicatively coupled via a network 605 via signal lines 609 and 611, respectively. For example, the mobile robot 603 and the recognition system management server 601 may be communicatively coupled to each other via the network 605 to exchange data, such as sensor data, appearance data, obstacle or context data, priority data, probabilities, etc. The signal lines 609 and 611 in FIG. 6 may be representative of one or more wired and/or wireless connections. As a further example, the mobile robot 603 may transmit sensor data to the recognition system management server 601 for processing and the recognition system management server 601 may process the data as described herein to detect and recognize objects and send data and/or results describing the recognized objects to the mobile robot 603 for use thereby during operation. In implementations where a recognition system management server 601 is not included, the mobile robot 603 may operate autonomously or in conjunction with other mobile robots 603 (not pictured) to detect and recognize subjects, collect data, update/create appearance models, etc. For instance, a mobile robot 603 may be networked via a computer network with other similar mobile robots 603 to perform the computations discussed herein.

While FIG. 6 depicts a single mobile robot 603 and recognition system management server 601, it should be understood that a variety of different system environments and configurations are possible, contemplated, and within the scope of the present disclosure. For instance, some implementations may include additional or fewer computing devices, services, and/or networks, and may implement various functionality locally or remotely on other computing devices. Further, various entities may be integrated into a single computing device or system or distributed across additional computing devices or systems, etc. For example, the appearance model management engine 635 may be stored in, executable by, and distributed across a combination of computing devices and/or systems or in one computing device and/or system.

The network 605 may include a standard type network, wired or wireless, and may have any number of configurations, such as a star configuration, token ring configuration, or other known configurations. The network 605 may include one or more local area networks ("LANs"), wide area networks ("WANs") (e.g., the Internet), virtual private networks ("VPNs"), peer-to-peer networks, near-field networks (e.g., Bluetooth™), cellular networks (e.g., 3G, 4G, other generations), and/or any other interconnected data path across which multiple computing nodes may communicate. Data may be transmitted in encrypted or unencrypted form between the nodes of the network 605 using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other known protocols.

The mobile robot 603 may be representative of or included in an autonomous computing system capable of perceiving, recognizing, and interpreting the significance of objects within its environment to perform an action. In an example, the mobile robot 603 may be representative of or incorporated into a social robot that can cooperate with humans and/or other robots to perform various tasks, or an autonomous system operating in populated environments. In some implementations, the mobile robot 603 may be incorporated in other systems as a component for detecting and recognizing objects. For example, the mobile robot 603 may be embedded in a machine or computer system for determining if a certain person or persons are present at a particular location and the machine or computer system can turn on/off or execute a particular program if that certain person or persons are present at the particular location.

In some implementations, the mobile robot 603 may include one or more sensor(s) 655, a processor 695 (which may represent one or more processors), a memory 637 (which represents one or more non-transitory memory devices), a database 697, and/or an interface 675. As depicted, the sensor(s) 655, the processor 695, the memory 637, the propulsion system 657, the interface 675, and the database 697 are electronically communicatively coupled via a communications bus 607. In some implementations, an instance of the appearance model management engine 635, or various components thereof, can be stored on and executable by the recognition system management server 601, as described elsewhere herein. The instances of the appearance model management engine 635 are also referred to herein individually and/or collectively as the appearance model management engine 635.

Although each of the processor 695, sensor(s) 655, memory 637, propulsion system 657, interface 675, database 697, etc., may be depicted and/or referred to herein in the singular or plural, it should be recognized that the mobile robot 603 can include any suitable number of these components. Furthermore, it should be appreciated that, depending on the configuration, the mobile robot 603 may include suitable elements explicitly not shown in FIG. 6, such as an operating system, programs, various additional sensors, motors, movement assemblies, input/output devices like a speaker, a display device, a transceiver unit and an antenna for wireless communication with other with other devices (e.g., the recognition system management server 601, other mobile robots 603 (not shown), any other appropriate systems (not shown) communicatively coupled to the network 605, etc.

The sensor(s) 655 may include one or more sensors configured to capture light and other signals from subjects and/or the surrounding environment and to generate and/or processes sensor data, therefrom. For instance the sensor(s) 655 may include a camera, such as but not limited to an RGB-D camera, a stereo camera, a structured light camera/scanner, time-of-flight camera, interferometer, modulation imager, a laser rangefinder, a light-field camera, an intensified CCD camera, etc., although it should be understood that other types of sensors may be used, such as but not limited to an ultrasound sensor, a color camera, an infrared camera, etc. In some implementations, the sensor(s) 655 and/or mobile robot 603 may include a combination of different types of sensors, such as accelerometers, gyroscopes, thermometers, barometers, thermocouples, microphones, or other conventional sensing devices. The sensor(s) 655 may be incorporated into the processor 695 or may be a disparate device that includes a separate controller that is coupled to the processor via a wireless or wired connection. Other variations are also possible and contemplated.

The processor 695 may include any processor-based computing device. The processor 695 may receive sensor data from the sensor(s) 655, process the sensor data, generate and/or provide results for presentation via the interface 675 based on the processing, trigger various programs based on the processing, control the behavior and/or movement of the mobile robot 603 or associated systems based on the processing, cooperate with the recognition system management server 601 to process the sensor data, etc., as described elsewhere herein. In some implementations, the processor 695 may store the processed sensor data and/or any results processed therefrom in the database 697.

The processor 695 may execute software instructions by performing various input/output, logical, and/or mathematical operations. The processor 695 may have various standard or customized computing architectures to process data signals. The processor 695 may be physical and/or virtual, and may include a single core or plurality of processing units and/or cores. In some implementations, the processor 695 may be capable of generating and providing electronic display signals to a display device, supporting the display of images, capturing and transmitting images, performing complex tasks including various types of feature extraction and sampling, etc. In some implementations, the processor 695 may be coupled to the memory 637 via the bus 607 to access data and instructions therefrom and store data therein. The bus 607 may couple the processor 695 to the other components of the mobile robot 603. The processor 695 and the appearance model management engine 635 are described in detail elsewhere herein.

The memory 637 may store and provide access to data to the other components of the computing system (e.g., the mobile robot 603, the recognition system management server 601, etc.). In some implementations, the memory 637 may store instructions and/or data that may be executed by the processor 695. For instance, the memory 637 may store the appearance model management engine 635 and/or components thereof. The memory 637 is also capable of storing other instructions and data, including, for example, an operating system, hardware drivers, firmware, other software applications, databases, etc. The memory 637 may be coupled to the bus 220 for communication with the processor 695 and the other components of the computing device 200.

The memory 637 includes one or more non-transitory computer-usable (e.g., readable, writeable, etc.) media, which can include an apparatus or device that can contain, store, communicate, propagate or transport instructions, data, computer programs, software, code, routines, etc., for processing by or in connection with the processor 695. In some implementations, the memory 637 may include one or more of volatile memory and non-volatile memory. For example, the memory 637 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray', etc.). It should be understood that the memory 637 may be a single device or may include multiple types of devices and configurations.

The interface 675 provides for communication with other computing entities of the system 900 and/or users of the system 900. The interface 675 may include any number of input and output devices. In some instances, the interface 675 includes one or more wired interfaces and/or wireless transceivers for sending and receiving data. The interface 675 may couple to the network 605 and communicate wiredly or wirelessly with other computing nodes, such as the mobile robot 603 and/or the recognition system management server 601 (depending on the configuration). The interface 675 may exchange data with other computing nodes using standard communication methods, such as those discussed above regarding the network 605.

The interface 675 may include hardware to handle communications between the user 625 and the processor 695. For example, the interface 675 may include one or more of a screen for displaying detection information to the user 625; a speaker for outputting sound information to the user 625; a microphone for capturing sound and/or voice commands; indicators (e.g., LEDs), and any other input/output components facilitating the communications with the user 625. In some implementations, the interface 675 is configured to transmit an output from the processor 695 to the user 625. For example, the interface 675 includes an audio system for playing a voice greeting to the user 625 responsive to the processor 695 detecting that the user 625 is within the vicinity. In some implementations, the interface 675 may present an audio or graphical signal to a subject requesting that the subject identify itself. For example, the interface 675 may emit audio asking a person to identify themselves and then record and process audio to determine the person's response. Similarly, the interface 675 may present a request on a display for requesting and, in some instances, receiving the identity of the person. It should be understood that the interface 675 may include other types of devices for providing the functionality described herein.

The user 625 may be a human user. In one implementation, the user 625 is driver or a passenger sitting in a vehicle on a road. In another implementation, the user 625 is a human located within a premises that interacts with a mobile robot 603. In a further implementation, the user is a conventional user of a computing device. The user 625 may interact with, or otherwise provide inputs to and/or receives outputs from, the interface 675 which sends and receives different types of data to and from the processor 695.

The database 697 is stored in a non-transitory storage medium/media, such as one or more a static random access memory (SRAM) devices, flash memories, hard disk drives, disk-based memory devices, or some other known volatile or non-volatile physical storage device. In some instances, the database 697 may store data in the memory 637. In some instances, the database 697 may be included in the mobile robot 603 or in another computing device and/or storage system distinct from but coupled to or accessible by the mobile robot 603. In some instances, the database 697 may store data in association with a database management system (DBMS) operable by the mobile robot 603 and/or the recognition system management server 601. For example, the DBMS could include a structured query language (SQL) DBMS, a NoSQL DMBS, flat file system, conventional file system, etc. In some instances, the DBMS may store data in multi-dimensional tables comprised of rows and columns, and manipulate, i.e., insert, query, update and/or delete, rows of data using programmatic operations. Further aspects of the database 697 are discussed below.

The recognition system management server 601 is one or more computing devices having a processor (e.g., a processor 695) (not pictured) and a non-transitory computer-readable storage medium (e.g., a memory 637) (not pictured) that may facilitate the mobile robot 603 to detect and recognize subjects, collect data, and update/create appearance models. In some implementations, the recognition system management server 601 includes an instance of the appearance model management engine 635. In network-based implementations, the recognition system management server 601 may receive sensor data, appearance data, detection data, grid data, location data, and/or any other data discussed herein, from the mobile robot 603 and/or other relevant information sources, process the data, and send results of processing to the requesting entity (e.g., mobile robot 603).

The appearance model management engine 635 may be coupled to the sensor(s) 655 to receive sensor data. In some implementations, the sensor data received from the sensor(s) 655 may include image data describing an image of a subject and/or an environment. A subject, for example, may be a living or a non-living object, an animate or inanimate object, etc. Example subjects include but are not limited humans, animals, furniture, fixtures, cars, utensils, tools, machinery, etc.

Figure 7:
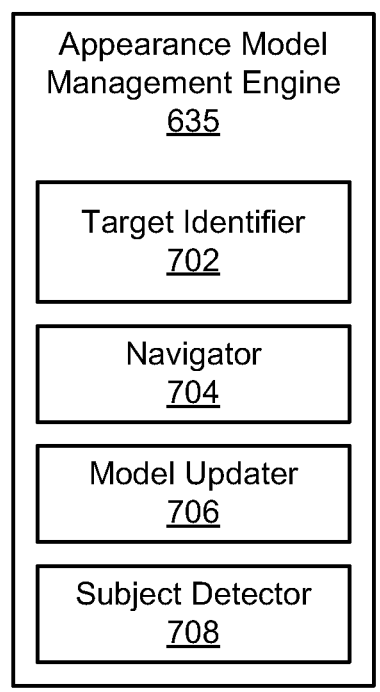
FIG. 7 is a block diagram of an example appearance model management engine.

FIG. 7 is a block diagram of an example appearance model management engine 635, which may include a target identifier 702, navigator 704, model updater 706, and subject detector 708, although it should be understood that the appearance model management engine 635 may include additional components and/or that various components may be combined into a single module or divided into additional modules.

The target identifier 702, navigator 704, model updater 706, and/or subject detector 708 may be implemented as software, hardware, or a combination of the foregoing. In some implementations, the target identifier 702, navigator 704, model updater 706, and/or subject detector 708 may be communicatively coupled by the bus 607 and/or the processor 695 to one another and/or the other components of the computing device. In some implementations, one or more of the target identifier 702, navigator 704, model updater 706, and/or subject detector 708 are sets of instructions executable by the processor 695 to provide their functionality. In further implementations, one or more of the target identifier 702, navigator 704, model updater 706, and/or subject detector 708 are stored in the memory 637 and are accessible and executable by the processor 695 to provide their functionality. In any of the foregoing implementations, the target identifier 702, navigator 704, model updater 706, and/or subject detector 708 may be adapted for cooperation and communication with the processor 695 and other components of the computing device (e.g., the mobile robot 603, the server 601, etc.).

Further structure, acts, and/or functionality of the target identifier 702, navigator 704, model updater 706, and/or subject detector 708 are discussed in detail elsewhere herein.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
    selecting, by one or more processors, a target of interest having an obsolete appearance model, the obsolete appearance model describing a prior appearance of the target of interest;
    navigating a first mobile robot to a location, the first mobile robot including a mechanical component providing motive force to the first mobile robot and an image sensor;
    searching for the target of interest at the location including navigating at the location while collecting identification data and identifying the target of interest with a threshold level of confidence in the identification of the target of interest based on the identification data;
    collecting, in the location by the image sensor of the first mobile robot, appearance data of the target of interest;
    updating, by the one or more processors, the obsolete appearance model using the appearance data of the target of interest; and
    in a subsequent meeting between the target of interest and a second mobile robot at a later point in time, recognizing, by the one or more processors, the target of interest using the updated appearance model.

2. The computer-implemented method of claim 1, wherein selecting the target of interest is based on a predicted probability that the obsolete appearance model of the target of interest is obsolete.

3. The computer-implemented method of claim 2, wherein the predicted probability that the obsolete appearance model of the target of interest is obsolete is based on an event detectable by the first mobile robot.

4. The computer-implemented method of claim 2, wherein the predicted probability that the obsolete appearance model of the target of interest is obsolete is based on a predicted time of an appearance of the target of interest changing.

5. The computer-implemented method of claim 1, wherein selecting the target of interest includes
    predicting a likelihood that the obsolete appearance model of the target of interest is obsolete, and
    determining whether the likelihood that the obsolete appearance model of the target of interest is obsolete satisfies a defined threshold.

6. The computer-implemented method of claim 1, further comprising, after updating the obsolete appearance model using the appearance data of the target of interest, selecting a second target of interest on a target of interest list.

7. The computer-implemented method of claim 1, further comprising updating, by the one or more processors, a target of interest list to indicate that the target of interest has the updated appearance model.

8. The computer-implemented method of claim 1, further comprising:
   physically moving the first mobile robot to the location by the mechanical component; and
   searching, by the first mobile robot, for the target of interest by physically moving the first mobile robot around the location.

9. The computer-implemented method of claim 1, wherein the location is predicted based on a history of locations where the first mobile robot has recognized the target of interest previously.

10. The computer-implemented method of claim 1, wherein collecting the appearance data of the target of interest includes physically moving the first mobile robot around the location while collecting the appearance data until sufficient appearance data has been collected to identify the target of interest as a particular subject and update the obsolete appearance model.

11. The computer-implemented method of claim 1, wherein the first mobile robot and the second mobile robot are the same mobile robot.

12. A system comprising:
    one or more non-transitory memories;
    one or more processors;
    one or more mobile robots including a mechanical component providing motive force to the one or more mobile robots and an image sensor;
    a target identifier executable to select a target of interest having an obsolete appearance model, the obsolete appearance model describing a prior appearance of the target of interest;
    a navigator executable to navigate a first mobile robot to a location and search for the target of interest at the location, searching for the target of interest including navigating at the location while collecting identification data and identifying the target of interest with a threshold level of confidence in the identification of the target of interest based on the identification data;
    a model updater executable to collect, in the location, appearance data of the target of interest and update, by the one or more processors, the obsolete appearance model using the appearance data of the target of interest; and
    a subject detector executable to, in a subsequent meeting between the target of interest and a second mobile robot at a later point in time, recognize, by the one or more processors, the target of interest using the updated appearance model.

13. The system of claim 12, wherein selecting the target of interest is based on a predicted probability that the obsolete appearance model of the target of interest is obsolete.

14. The system of claim 13, wherein the predicted probability that the obsolete appearance model of the target of interest is obsolete is based on an event detectable by the first mobile robot.

15. The system of claim 13, wherein the predicted probability that the obsolete appearance model of the target of interest is obsolete is based on a predicted time of an appearance of the target of interest changing.

16. The system of claim 12, wherein selecting the target of interest includes
    predicting a likelihood that the obsolete appearance model of the target of interest is obsolete, and
    determining whether the likelihood that the obsolete appearance model of the target of interest is obsolete satisfies a defined threshold.

17. The system of claim 12, wherein the target identifier is further executable to, after updating the obsolete appearance model using the appearance data of the target of interest, select a second target of interest on a target of interest list.

18. The system of claim 12, wherein the target identifier is further executable to update, by the one or more processors, a target of interest list to indicate that the target of interest has the updated appearance model.

19. The system of claim 12, wherein the navigator is further executable to
    physically move the first mobile robot to the location by the mechanical component, and
    search, by the first mobile robot, for the target of interest by physically moving the first mobile robot around the location.

20. The system of claim 12, wherein the location is predicted based on a history of locations where the first mobile robot has recognized the target of interest previously.

21. The system of claim 12, wherein collecting the appearance data of the target of interest includes physically moving the first mobile robot around the location while collecting the appearance data until sufficient appearance data has been collected to identify the target of interest as a particular subject and update the obsolete appearance model.

22. The system of claim 12, wherein the first mobile robot and the second mobile robot are the same mobile robot.

23. A computer-implemented method comprising:
    selecting, by one or more processors, a target of interest having an obsolete appearance model, the obsolete appearance model describing a prior appearance of the target of interest;
    searching an environment using a mobile computing device for the target of interest, the mobile computing device including a mechanical component providing motive force to navigate the environment and a sensor to monitor the environment, searching the environment for the target of interest including navigating the mobile computing device at the environment while collecting identification data and identifying the target of interest based on the identification data with a threshold level of confidence in the identification of the target of interest;
    collecting, in the environment by the sensor of the mobile computing device, appearance data of the target of interest; and
    updating, by the one or more processors, the obsolete appearance model using the appearance data of the target of interest.

24. The computer-implemented method of claim 23, wherein selecting the target of interest is based on a predicted probability that the obsolete appearance model of the target of interest is obsolete.

25. The computer-implemented method of claim 24, wherein the predicted probability that the obsolete appearance model of the target of interest is obsolete is based on a detectable event.

26. The computer-implemented method of claim 24, wherein the predicted probability that the obsolete appearance model of the target of interest is obsolete is based on a predicted time that an appearance of the target of interest has changed.

27. The computer-implemented method of claim 23, wherein selecting the target of interest includes
predicting a likelihood of the obsolete appearance model of the target of interest being obsolete, and
determining whether the likelihood of the obsolete appearance model of the target of interest being obsolete satisfies a defined threshold.

28. The computer-implemented method of claim 23, further comprising, after updating the obsolete appearance model using the appearance data of the target of interest, selecting a second target of interest on a target of interest list.

29. The computer-implemented method of claim 23, further comprising updating, by the one or more processors, a target of interest list to indicate that the target of interest has the updated appearance model.

30. The computer-implemented method of claim 23, further comprising:
physically moving the mobile computing device to the environment; and
searching, by the mobile computing device, for the target of interest by physically moving the mobile computing device around the environment, and identifying the target of interest at the environment at a level of confidence satisfying a predetermined threshold.

31. The computer-implemented method of claim 23, wherein the environment is predicted based on a history of environments where the target of interest has been recognized previously.

32. The computer-implemented method of claim 23, wherein collecting the appearance data of the target of interest includes physically moving the mobile computing device around the environment while collecting the appearance data until sufficient appearance data has been collected to update the obsolete appearance model.

* * * * *